H. SYNCK.
FERTILIZER DISTRIBUTER AND BEATER.
APPLICATION FILED APR. 26, 1912.
1,053,547.
Patented Feb. 18, 1913.
2 SHEETS—SHEET 2.
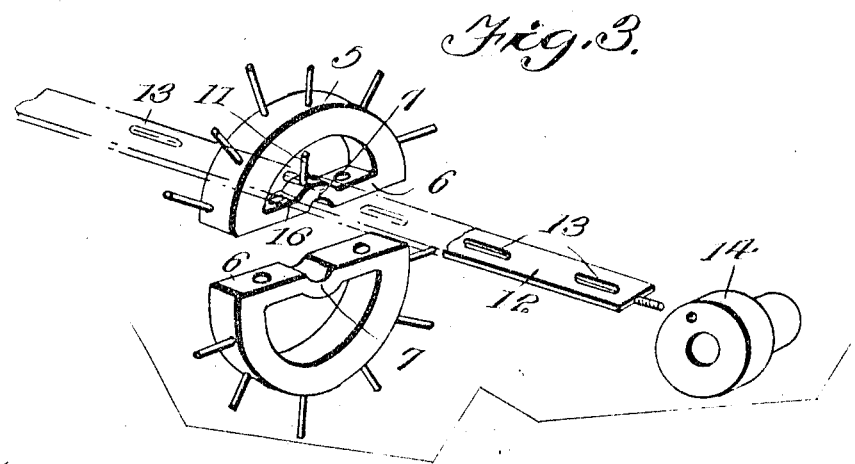
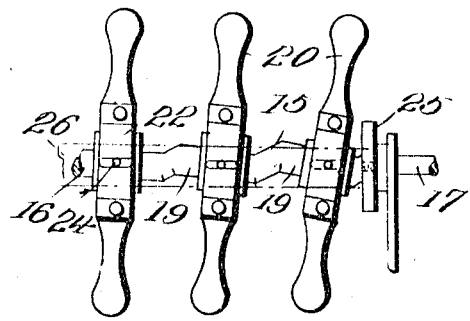
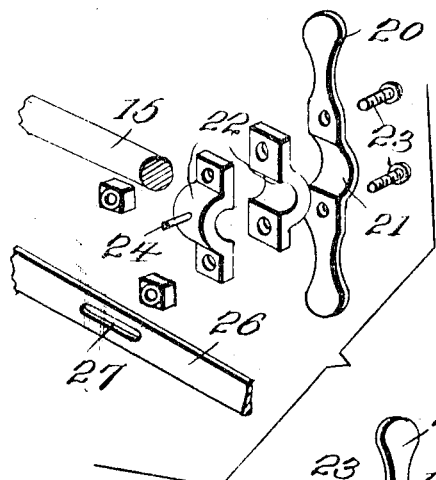
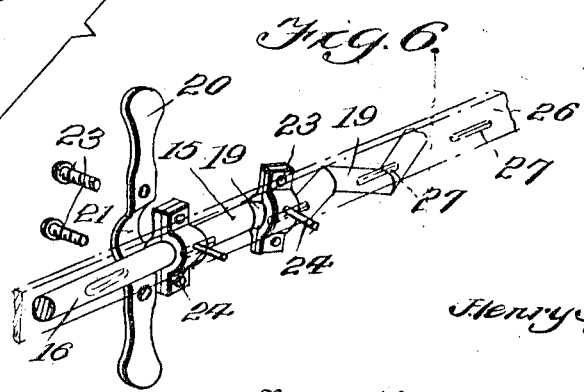
Inventor
Henry Synck.

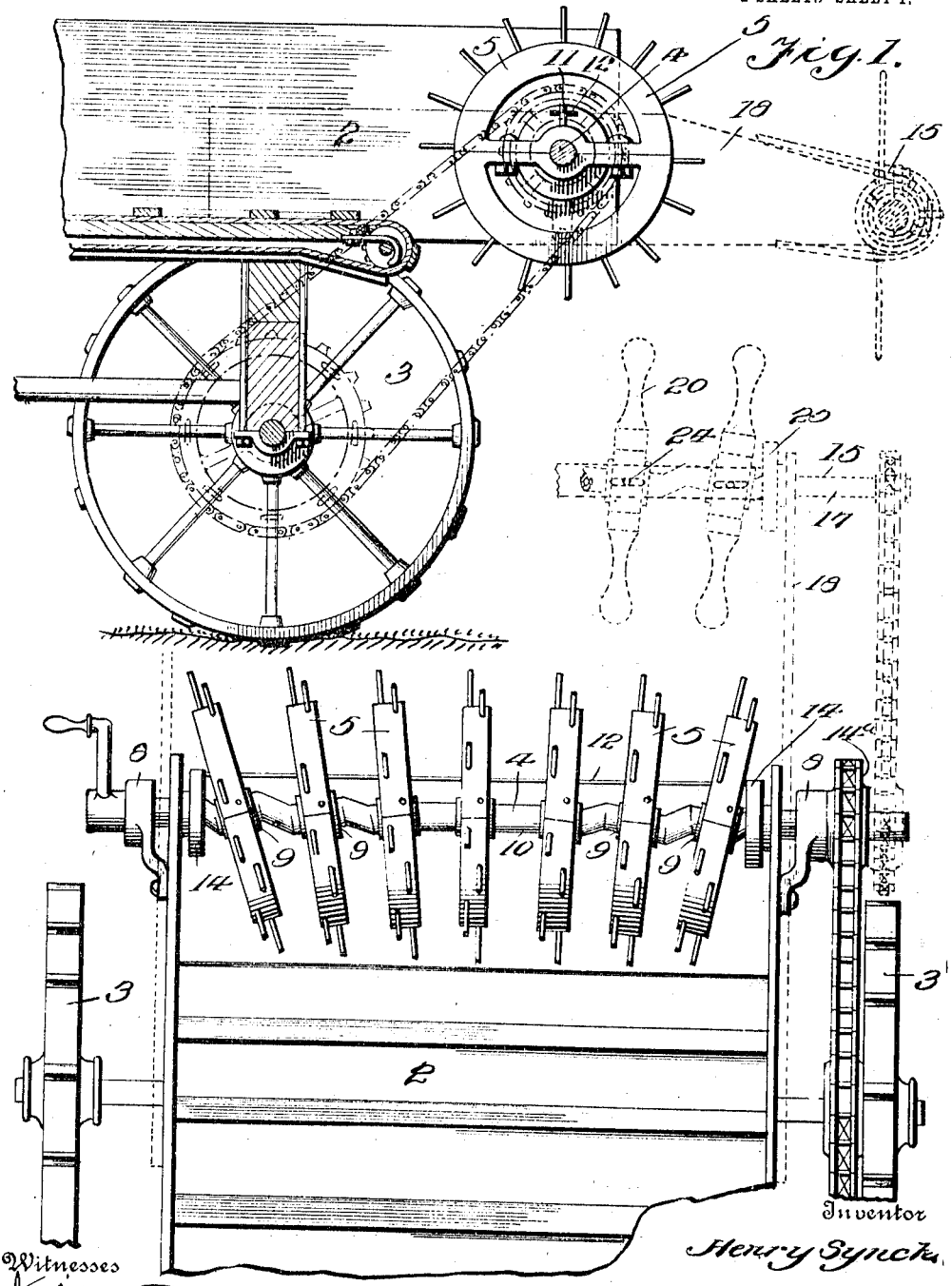

UNITED STATES PATENT OFFICE.

HENRY SYNCK, OF COLDWATER, OHIO, ASSIGNOR TO NEW IDEA SPREADER COMPANY, OF COLDWATER, OHIO.

FERTILIZER DISTRIBUTER AND BEATER.

1,053,547.  Specification of Letters Patent.  Patented Feb. 18, 1913.

Application filed April 26, 1912. Serial No. 693,382.

*To all whom it may concern:*

Be it known that I, HENRY SYNCK, a citizen of the United States, residing at Coldwater, in the county of Mercer and State of Ohio, have invented certain new and useful Improvements in Fertilizer Distributers and Beaters, of which the following is a specification.

My invention relates to distributing mechanism, and particularly to distributing and spreading devices for manure spreaders or like machines. In this class of devices it is particularly necessary that means be provided for distributing the manure or compost laterally in a swath greater than the width of the wagon.

The primary object of my invention is to accomplish the lateral casting or distribution of the manure in a very simple and thoroughly effective manner and further to provide distributing mechanism having the form of paddles, teeth or like members, which though throwing the distributed material laterally, are always in alinement with or works squarely across the bed of the material. This is a particularly important feature for the reason that when these paddles, teeth or like members are used on a primary pulverizing cylinder or as a re-pulverizing and distributing device, it is much better to have the members arranged parallel to the end of the wagon body than to have such devices arranged at an angle to the end of the body.

A further object is to provide a distributer comprising a plurality of distributing members arranged each at an angle to the line of flow of the material to be distributed, the several distributers being arranged at angles relatively to each other.

A further object in this connection is to provide a very simple means whereby the several distributing members may be rotated in unison.

Other objects will appear in the course of the following description.

My invention is illustrated in the accompanying drawings wherein:

Figure 1 is a fragmentary longitudinal sectional view of a fertilizer distributing wagon with my invention applied thereto, the figure also showing in dotted lines a distributer proper mounted behind the primary pulverizing and distributing cylinder. Fig. 2 is a plan view of the construction shown in Fig. 1 and showing in dotted lines the position of the distributing paddles. Fig. 3 is a perspective view of one of the distributing annuli and the bar by which rotary motion is given to it. Fig. 4 is a fragmentary view of my invention applied to the distributing paddles. Fig. 5 is a perspective view of the distributing paddles, the improvements for clamping them upon the shaft and the actuating bar. Fig. 6 is a perspective detail view of the cranked shaft, the collars for carrying the distributing paddles, the figure showing in dotted lines whereby the paddles are actuated.

Corresponding and like parts are referred to in the following description and indicated in all the views of the accompanying drawings by the same reference characters.

In the accompanying drawings, 2 designates a wagon body of any suitable character, the body being supported on the usual wheels 3. Disposed in the rear end of the wagon body is my improved pulverizing and spreading device. In the construction illustrated in Fig. 1 and now to be described, my invention is applied to this pulverizing and spreading device, but it may be used solely in connection with the distributing portion of the apparatus as will be hereafter explained.

The pulverizing and spreading construction illustrated comprises a shaft 4 upon which are mounted a plurality of annuli 5, these annuli being connected to the shaft by means of radial arms 6 and a hub 7. Any suitable construction may be used for these annuli, the arms and the hub, but I have illustrated each annulus as being made up of half sections, bolted together and to the arms. I do not, however, wish to be limited to this construction.

The shaft 4 is a cranked shaft. At its ends the shaft is supported in bearings 8 mounted in any suitable manner upon the frame of the wagon body but intermediate its ends, the shaft is provided at intervals with cranked portion 9 which are set at an angle to the general direction of the shaft. Preferably the middle of the shaft at 10 extends in line with the extremities of the shaft, and preferably the cranked portions 9 on each side of the middle are inclined in opposite directions. The shaft 4 is fixed and does not rotate, and the distributing members, composed in this instance of the annuli 5 and arms 6, rotate in suitable bearings formed upon the cranked portions of the shaft. It will be seen from Fig. 2 that the annuli on one side of the middle are set so that their rear ends extend rearward and to the right, while the annuli on the left side of the middle extend toward the rear and to the left.

It will be obvious that all of the distributing disks or annuli might be made to throw in the same direction, that is, to be arranged parallel to each other, but the preferred construction as above stated is to so mount them that they will throw to the right and to the left and so mount them that the direction of the bearings on which the distributing members are mounted will vary in angularity, this angularity being less near the center and more toward the ends, as illustrated in Fig. 2. In this way the distributing members near the ends of the shaft will have a greater lateral throw than those near the center. For the purpose of rotating these annuli or pulverizing and distributing members, I have provided the hub of each annulus with a radially projecting pin designated 11 (see Fig. 3). This pin is disposed in the plane of its corresponding annulus. Extending entirely across the wagon body is a bar 12 formed with longitudinally extending slots 13, one for each pin 11, the pin of each annulus projecting into and through its corresponding slot. The bar 12 is mounted at its ends in rotatable members 14 one of which is shown as carrying a sprocket wheel 14ª, and these rotatable members may be connected in any suitable manner to the gearing whereby the distributer is driven. Thus the sprocket wheel may be connected by a sprocket chain to a driving shaft in turn operatively connected to the axle of the wagon. I have not shown any particular means for this purpose because such a mechanism is well known, and I do not wish to be limited to any particular manner of driving the sprocket wheels of the bar 12.

Each annulus 5 may be provided with any suitable pins, blades, paddles, teeth or other elements for acting upon, pulverizing and casting the manure. The pins may be set upon the rim of the annulus in a staggered relation, and when so disposed, the pins will act to pulverize and triturate the compost or manure, and will also act to cast it out from the tail of the wagon.

As stated before, I do not wish to be limited to any particular construction for the distributing or pulverizing members. Neither do I wish to be limited to the use of my invention to form the distributing cylinder or beater of a manure spreader as it may be used not only for pulverizing or beating the manure, but for spreading it solely.

In dotted lines in Fig. 1, I have illustrated the invention used as a distributer pure and simple, and in this form of the invention I substitute paddles for the toothed annuli previously described. In this form of the invention, 15 designates a fixed shaft which has a straight middle portion 16 and straight ends 17, these ends of the shaft being supported in brackets 18 or in any other suitable manner upon the sides of the wagon body. The intermediate portions of the shaft between the middle and the ends thereof are bent as previously described so as to provide angular bearings 19 (see Figs. 4 and 6), and mounted upon each angular bearing are a plurality of blades 20.

While I do not wish to be limited to the particular means illustrated for holding the blades upon the shaft, I preferably form the blades with a middle half collar 21, and provide semicircular half bearings 22 which have lateral flanges through which bolts 23 pass, these bolts also entering the blades 20. By setting up these bolts, the bearings may be closed into working engagement with the shaft.

Projecting from one of the bearing members 22 is a radial pin 24. There is of course one of these radial pins for each set of paddles. Rotatably mounted upon the ends of the shafts are the disks 25, which in the form illustrated are shown as sprocket wheels, and carried at its ends on these disks and extending transversely across the wagon is a bar 26 which is parallel to the general direction of the shaft and which is formed with slots 27 into which the pins 24 project in precisely the same manner as heretofore described. These slots are sufficiently long to permit the pins to oscillate as the bar is carried around the shaft. The movement of the bar around the shaft, which is caused by the rotation of the disks 25, will of course rotate the paddles. These paddles are to be set in precisely the same manner as heretofore described for the annuli, and it will be obvious that the paddles may be set at any desired angle with relation to each other or with relation to the end of the wagon.

It is to be particularly noted that though the paddles (and the annuli also) throw laterally, the general direction of the shaft on which the paddles operate is transverse of or square across the bed of material. It has heretofore been proposed to provide a number of small distributing members revolving on a shaft, said shaft being in two sections coupled together by universal coupling, and the sections being at an angle to each other so that the paddles or other devices mounted upon each section would cast the manure laterally, but in this case the complete shaft would not be parallel to the end of the bed of material or to the end of the wagon, but the shaft would project out therefrom at its middle. When this device is used either as a primary pulverizing cylinder or as a re-pulverizing and distributing cylinder, it would be much better to have the shaft extend straight across the wagon than to have it angular in form because the material flowing off from a straight cylinder or distributer and pulverizing cylinder can flow on over a straight distributer. Otherwise, the middle of the shaft would be too far away from the path of the outflowing material, or the outside ends of the shaft would be too close.

It is of course to be understood that my invention is applicable either to beaters used in pulverizing and distributing the fertilizer, or to beaters used in simply spreading the fertilizer after it has been pulverized and thrown rearward by the primary distributer.

I do not wish to limit myself to any particular mechanism for operating this device nor to any of the details of construction.

What I claim is:

1. A fertilizer distributing mechanism including a body for holding fertilizer, a shaft extending transversely of the body and parallel to the end of the body, and a plurality of rotatable beaters mounted upon said shaft, each rotatable in a plane at an angle to the longitudinal axis of the body.

2. A fertilizer distributing mechanism including a body for holding fertilizer, a fixed shaft extending transversely of the body and parallel to the end thereof, a plurality of rotatable beaters rotatably mounted upon said shaft and each beater being rotatable in a plane at an angle to the longitudinal axis of the body, and means for rotating said beaters.

3. A fertilizer distributing mechanism including a body for holding fertilizer, a fixed shaft extending transversely of the body and parallel to the end thereof, a plurality of beaters rotatably mounted upon the fixed shaft and each rotatable in a plane at an angle to the longitudinal axis of the body, and means engaging all of said beaters whereby the beaters may be rotated.

4. A fertilizer distributing mechanism including a body for holding fertilizer, a fixed shaft extending transversely of the body and parallel to the end thereof, a plurality of beaters rotatably mounted upon the fixed shaft and each rotatable in a plane at an angle to the longitudinal axis of the body, rotatable members mounted upon the ends of the shaft, and means mounted upon the rotatable members extending along the shaft and engaging all of said beaters whereby the latter may be rotated in unison with the said rotatable members.

5. A fertilizer distributing mechanism including a body for holding fertilizer, a fixed shaft extending across the body parallel to the end thereof, said shaft having angular portions in its length forming bearings, and a plurality of rotatable beaters mounted upon said angular portions and being thereby rotatable in planes extending at an angle to the longitudinal axis of the body.

6. A fertilizer distributer including a body for holding fertilizer, a fixed shaft extending across the body parallel to the end thereof, said shaft being formed with a plurality of angular portions forming bearings set at an angle to the general direction of a shaft, a plurality of beaters, each rotatably mounted upon one of the angular portions, and means for rotating all of said beaters in unison.

7. A fertilizer distributing mechanism including a body for holding fertilizer, a fixed shaft extending transversely of the body and parallel to the end thereof, said shaft being formed with angular portions on each side of the middle of the shaft, the angular portions on one side of the middle being set reversely to the angular portions on the opposite side of the middle, and rotatable beaters mounted upon said angular portions and rotatable in planes at an angle to the longitudinal axis of the body.

8. A fertilizer distributing mechanism including a body for holding fertilizer, a fixed shaft extending across the body parallel to the end of the body, said shaft having a straight middle portion and a plurality of angular portions forming bearings, having an angular relation to the end of the body, the angular portions on one side of the middle being set reversely to the angular portions on the other side, a plurality of beaters rotatably mounted, each upon one of said angular portions and each rotatable in a plane at an angle to the longitudinal axis of the beater, a pin projecting from each of the beaters, rotatable members mounted upon the ends of the shaft, and a bar mounted upon the rotatable members and extending parallel to the shaft, said bar having slots within which said pins engage.

9. A fertilizer distributer including a body for holding fertilizer, a fixed shaft extending transversely of the body, a plurality of beaters rotatably mounted upon the fixed shaft and each rotatable in a plane at an angle to the longitudinal axis of the body, and means moving in a closed path across and engaging all of said beaters whereby the beaters may be rotated.

In testimony whereof I affix my signature in presence of two witnesses.

HENRY SYNCK. [L. S.]

Witnesses:
V. F. LOCHTEFED,
C. H. LOCHTEFELD.